United States Patent
Wiese, Jr. et al.

[15] 3,663,257
[45] May 16, 1972

[54] TRANSPARENT HEAT-SENSITIVE FILM

[72] Inventors: Joseph A. Wiese, Jr.; George Van Dyke Tiers, both of St. Paul, Minn.

[73] Assignee: Minnesota Mining and Manufacturing Company, St. Paul, Minn.

[22] Filed: Nov. 16, 1970

[21] Appl. No.: 90,119

[52] U.S. Cl. .................. 117/36.8, 117/138.8 F, 117/155 UA
[51] Int. Cl. ........................................................... B41m 5/22
[58] Field of Search .............................. 117/36.2, 36.8, 36.9

[56] References Cited

UNITED STATES PATENTS

| | | | |
|---|---|---|---|
| 3,166,583 | 1/1965 | Martin et al. | 117/36.8 |
| 3,293,061 | 12/1966 | Lawton | 117/36.8 |
| 3,413,138 | 11/1968 | Georgalas | 117/36.8 |
| 3,473,945 | 10/1969 | Futaki | 117/36.8 |
| 3,483,013 | 12/1969 | Berg et al. | 117/36.2 |
| 3,573,958 | 6/1971 | Small | 117/36.8 |
| 3,594,208 | 7/1971 | Wiese et al. | 117/36.9 |

*Primary Examiner*—Murray Katz
*Attorney*—Kinney, Alexander, Sell, Steldt & Delahunt

[57] ABSTRACT

A clear transparent film, which gives a color projection image when thermographically heated, contains a protonatable chromogenous dye-forming color progenitor together with a salt of a strong organic acid and a strong base in a transparent heat-decomposable halogen-containing polymeric binder.

9 Claims, No Drawings

TRANSPARENT HEAT-SENSITIVE FILM

This invention relates to the projection of light-images in color and to sheet materials for use therein. In one aspect the invention relates to clear transparent film products on which dense long-lasting color projection images may be produced thermographically.

As described in U.S. Pat. No. 3,483,013, long-lasting color projection transparencies may be produced by brief exposure to intense heat-producing radiation of a graphic original in heat-conductive contact with a couplet of an acid source sheet and a transparent receptor sheet carrying a protonatable chromogenous dye-forming color progenitor in a vinyl chloride polymer binder. The two-sheet couplet is inconvenient and wasteful as compared with an integral sheet but avoids the pre-reaction which would otherwise occur in attempting to introduce the two reactants into an integral structure. The presence of the vinyl chloride polymer is found to extend the useful life of the color projection image.

The present invention similarly provides for the preparation of long-lasting color projection transparencies, but avoids the difficulties and disadvantages of the two-sheet couplet by employing an integral heat-sensitive film. As in U.S. Pat. No. 3,483,013, the film contains a protonatable chromogenous dye-forming color progenitor in a halogen-containing polymeric binder; but no external source of acid is required, and the components do not undergo premature color-forming reaction when mixed together in a mutual solvent during preparation of the film or coating.

In the present invention, advantage is taken of the ability of halogen-containing polymers to decompose when heated, with liberation of hydrogen halide. Particularly in the absence of significant amounts of stabilizers, polymers of major proportions of monomers such as vinyl chloride or bromide and vinylidene chloride or bromide are found to liberate hydrogen halide under the heating conditions experienced during thermographic copying. A presently preferred polymer which is readily available commercially is Saran F-220, an acetone-soluble copolymer of vinylidene chloride and acrylonitrile.

Films and coatings of protonatable color progenitor and Saran F-220 polymer themselves capable of forming colored image in the thermographic copying process, but the images are weak and impermanent and are not acceptable for projection on the overhead projector. Furthermore such sheets exhibit a strong tendency to discolor uniformly under prolonged aging or storage.

In accordance with the present invention, it has now been found that the incorporation, in the same layer with the protonatable color progenitor and Saran F-220 polymer of certain neutral salts having a large anion, produces sheet materials which are stable for prolonged periods of normal aging, and which permit the thermographic preparation of color images of high color intensity and permanence.

The additive materials may be defined as neutral salts having (a) an anion of an acid having a primary pKa value not greater than 4 and a molecular weight not less than 150, and (b) a cation of a base having a pKb value of less than 2, neither being decomposable by brief heating at 150° C. The compound tetramethylammonium-2,4-dichlorophenoxyacetate, having the structure

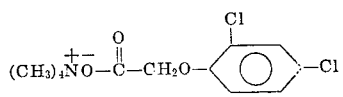

is a preferred and particularly effective example. The pKa value is 2.64, the pKb is less than 2, and the neutral equivalent of the anion acid is 221. Another equally effective salt is

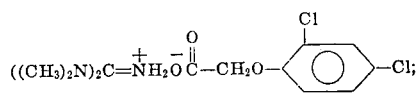

pKa=2.64, pKb=0.4, n.e.=221. Other useful but slightly less effective salts are as tabulated below:

| Structure | pKa | pKb | M.W. |
|---|---|---|---|
| (n—C$_4$H$_9$)$_4$$\overset{+-}{N}$O—C(=O)—CH$_2$O—C$_6$H$_3$(Cl)—Cl | 2.64 | 2 | 221 |
| (CH$_3$)$_4$$\overset{+-}{N}$O—C(=O)—C$_6$H$_3$(NO$_2$)—NO$_2$ | 2.82 | 2 | 212 |
| [((CH$_3$)$_4$N)$_2$]SO$_3$—C$_6$H$_4$—SO$_3$ | ¹2.5 | 2 | 238 |
| (CH$_3$)$_4$$\overset{+-}{N}$OSO$_2$CF$_3$ | (1-4) | 2 | 150 |
| (CH$_3$)$_4$$\overset{+-}{N}$OSO$_2$—C$_6$H$_4$—CH$_3$ | (1-4) | 2 | 172 |

¹ Ca (about).

The acid and base constants obtained from the following references: G. Kortum, W. Vogel and K. Andrussow, "Dissociation Constants of Organic Acids in Aqueous Solution," Butterworths, London (1961) and D. D. Perrin, "Dissociation Constants of Organic Bases in Aqueous Solution," Butterworths, London (1965).

The binder, color progenitor and salt are dissolved together in an inert volatile organic liquid such as acetone or methylethylketone and then coated on a suitable substrate and dried. A temporary substrate, e.g., a smooth metal or glass panel, may be used and the dry film removed to provide heat-sensitive sheets of extreme thinness. The coating may be applied to a permanent non-transparent backing, e.g., paper, to provide a heat-sensitive copy-sheet. More particularly, the coating is applied on a thin heat-resistant clear transparent plastic film, e.g., 2 mil Mylar polyester film, to form a heat-sensitive film product useful in making color projection transparencies.

Very small proportions of color progenitor, for example within the approximate range of 1 to 3 parts per 100 parts of binder, by weight, give intense color images which are still transparent and capable of projection as colored images on a viewing screen. Very small amounts of salt, i.e., in amounts approximately equal to the amount of color progenitor, are found to impart a significant increase over the color intensity obtainable in the absence thereof. Larger amounts are preferred, ratios of 10 to 20 parts of salt to one part of dye and up to at least about 25 parts of salt to 100 parts of binder being particularly useful. Within these approximate ranges the salt, the color precursor, and the resulting color material are all fully soluble or molecularly dispersed in the clear binder so that the coating is clear and transparent and exhibits no significant visible cloudiness.

The following specific Examples will further illustrate but not limit the practice of the invention.

EXAMPLE 1

| | |
|---|---|
| 16.7% solution of Saran F—220 polymer in methylethylketone | 10 gm. |
| N-(bis-(4-dimethylaminophenyl)methyl) pyrrolidine (Color Precursor No. 1) | 0.05 gm. |
| Solution of one part by weight of tetra-methylammonium-2,4-dichlorophenoxyacetate in two parts ethanol (20 drops =) | 1 ml. |

The absence of free acid in the salt solution may be assured, if necessary, by the addition of a trace of potassium hydroxide.

The color precursor is dissolved in the binder solution. The salt solution is added with mixing. The clear solution is coated on two mil Mylar polyester film at a coating thickness of three mils and is permitted to dry. The dried sheet is clear and transparent.

The sheet is placed with its coated surface against the printed surface of a typewritten document and the composite is briefly exposed to intense infra-red radiation in a thermographic copying machine. A clear and distinct cyan image is produced in the coating. The film is placed on an overhead projector and the image is projected in color on the screen. Both image and background remain visibly substantially unchanged after four hours of continuous projection.

A control sheet similarly prepared except for the omission of the salt solution, copied at a slower speed (increased copying temperature), and similarly tested, develops a faintly visible image which on projection is scarcely distinguishable from the white background. On continued projection the entire sheet gradually becomes colored.

EXAMPLE 2

To 10 grams of the binder solution of Example 1 is added 0.02 gram of N-(n-butyl)-N'-(bis(4-dimethylaminophenyl) methylene) urea, a color progenitor having the structure

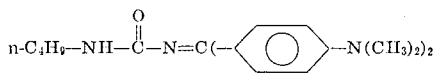

as described in application, Ser. No. 668,708 filed Sept. 18, 1967. To this solution is added 1 ml. of a salt solution as identified in Example 1. The mixture is coated and dried, and the clear coated film is tested as for Example 1. A stable red image on a white background is obtained by projection.

EXAMPLE 3

The protonatable color progenitor compound having the structure

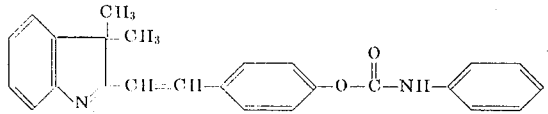

as described in application, Ser. No. 883,757 filed June 16, 1969 is substituted for the color progenitor of Example 1. A stable yellow projection image is obtained.

Other color progenitors, e.g., as identified in U.S. Pat. No. 3,483,013, and mixture of such materials may be used to provide other specific colors; and multicolor projections may be provided by stacking two or more monocolor image films in registry. The same compositions or coatings, with or without further additives, may be applied to non-transparent backings or carriers to form heat-sensitive copy-sheets useful in making color prints or copies for direct visual inspection and for other purposes.

What is claimed is as follows:

1. Heat-sensitive sheet material adapted for making a record in color of a heat pattern produced by brief exposure of a differentially radiation-absorptive original to intense radiation and including a heat-sensitive layer of a composition comprising, by weight, 100 parts of halogen-containing polymeric binder which liberates hydrogen halide when heated to 150° C., about one to about three parts of protonatable chromogenous dye-forming color progenitor, and about one to about 25 parts of neutral salt having (a) an anion of an acid having a pKa value not higher than 4 and a molecular weight not less than 150, and (b) a cation of a base having a pKb value of less than 2, neither of (a) and (b) being decomposable by brief heating at 150° C.

2. Sheet material of claim 1 including a permanent backing for said heat-sensitive layer.

3. Sheet material of claim 2 wherein said backing is a thin clear transparent heat-resistant film.

4. Sheet material of claim 1 wherein said binder is an acetone-soluble copolymer of polyvinylidene chloride and acrylonitrile.

5. Sheet material of claim 1 wherein said anion is aromatic.

6. Sheet material of claim 5 wherein said salt is a tetraalkylammonium-2,4-dichlorophenoxyacetate.

7. Sheet material of claim 4 wherein said salt is tetramethylammonium-2,4-dichlorophenoxyacetate and said color progenitor is N-(bis-(4-dimethylaminophenyl)methyl)pyrrolidine.

8. Sheet material of claim 4 wherein said salt is tetramethylammonium-2,4-dichlorophenoxyacetate and said color progenitor is N-(n-butyl)-N'-(bis-(4-dimethylaminophenyl) methylene)urea.

9. Sheet material of claim 4 wherein said salt is tetramethylammonium-2,4-dichlorophenoxyacetate and said color progenitor is a compound having the structure

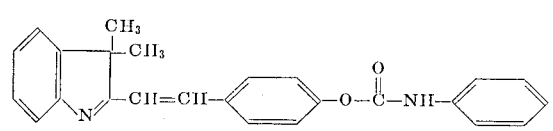

* * * * *